United States Patent
Miyake et al.

(10) Patent No.: US 12,479,393 B2
(45) Date of Patent: Nov. 25, 2025

(54) VEHICLE SEAT

(71) Applicant: TOYOTA BOSHOKU KABUSHIKI KAISHA, Aichi-ken (JP)

(72) Inventors: Rintaro Miyake, Nagoya (JP); Satoshi Fukatsu, Anjo (JP); Atsushi Nitta, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 19/089,380

(22) Filed: Mar. 25, 2025

(65) Prior Publication Data

US 2025/0313171 A1    Oct. 9, 2025

(30) Foreign Application Priority Data

Apr. 3, 2024 (JP) ................. 2024-060068

(51) Int. Cl.
*B60R 21/2165* (2011.01)
*B60N 2/58* (2006.01)
*B60R 21/215* (2011.01)

(52) U.S. Cl.
CPC ........ *B60R 21/2165* (2013.01); *B60N 2/5883* (2013.01); *B60N 2002/5808* (2013.01); *B60R 2021/21531* (2013.01)

(58) Field of Classification Search
CPC ...... B60R 21/2165; B60R 2021/21531; B60N 2/5883; B60N 2002/5808
See application file for complete search history.

(56) References Cited

U.S. PATENT DOCUMENTS

| | | | | |
|---|---|---|---|---|
| 10,843,601 B2 * | 11/2020 | Ohtsu | ............... | B60N 2/5883 |
| 11,597,308 B2 * | 3/2023 | Lorenzi | ............... | B60N 2/5883 |
| 12,319,179 B2 * | 6/2025 | Okui | ............... | B60N 2/5825 |
| 2024/0262311 A1 * | 8/2024 | Tomita | ............... | B60R 21/207 |
| 2025/0091492 A1 * | 3/2025 | Shifeng | ............... | B60N 2/5875 |

FOREIGN PATENT DOCUMENTS

| | | | | |
|---|---|---|---|---|
| CN | 117440899 A | * | 1/2024 | ............ B60N 2/58 |
| DE | 10238909 C1 | * | 10/2003 | ........... B60N 2/5883 |
| JP | 2002-2344 | | 1/2002 | |
| KR | 20100060546 A | * | 6/2010 | ........... B60N 2/5825 |

* cited by examiner

*Primary Examiner* — Faye M Fleming
(74) *Attorney, Agent, or Firm* — Greenblum & Bernstein, P.L.C.

(57) ABSTRACT

A vehicle seat has a seat back which includes a seat cover that forms an outer surface of the seat, and an airbag that is held on a seat inner side of the seat cover. The airbag is deployed toward a seat occupant side while a burst portion formed at a sewn portion of the seat cover is released. In the burst portion, a first sewing line extending in a seat up-down direction and a second sewing line extending in a direction intersecting the first sewing line intersect with each other. Assuming that the seat cover portion around the burst portion is divided into a plurality of sections by the first sewing line and the second sewing line, a webbing cloth is provided for each section to regulate stretch of the seat cover in a planar direction when the airbag is deployed.

6 Claims, 9 Drawing Sheets

VEHICLE SEAT

CROSS REFERENCE TO RELATED APPLICATIONS

This application is based on Japanese Patent Applications No. 2024-060068 filed on Apr. 3, 2024, the entire contents of which are incorporated herein by reference.

TECHNICAL FIELD

The present invention relates to a vehicle seat having a seat cover forming an outer surface of a seat and an airbag held on a seat inner side of the seat cover.

BACKGROUND ART

A technique relating to this type of vehicle seat is disclosed in JP2002-2344A. The vehicle seat of JP2002-2344A has a seat back that serves as a backrest and is provided at rear part of a seat cushion that serves as a seating portion. The seat back also has a seat cover that defines its outer shape and a pad that is covered by the seat cover. An airbag device is disposed in the seat back at a side portion (left portion) in a seat width direction. This airbag device is held on a back side of the pad and is disposed on a seat inner side of the seat cover that forms an outer surface of the seat. In an event of a vehicle collision, an airbag expands from the airbag device and tears a seam portion of the seat cover, ejecting toward a seat occupant side.

Here, the above-described seat cover has a cross-shaped seam portion from which the airbag will be deployed. That is, the seat cover has a vertical seam portion between a seat skin covering portion (a cover portion on a seating surface side) and a flank covering portion (a cover portion on a right flank surface side) so as to extend in a seat up-down direction. In addition, a horizontal seam portion provided on the flank covering portion extends in a seat front-rear direction and crosses the vertical seam portion in a crisscross pattern. Furthermore, on a back side of the flank covering portion, webbing cloths having a strip shape are respectively provided above and below the horizontal seam portion so as to extend in the seat front-rear direction. In the above-described configuration, when the airbag is deployed, the upper and lower webbing cloths restricts stretch of the seat cover, thereby promoting tearing of the vertical seam portion. Furthermore, the horizontal seam portion is torn open by inflation pressure of the airbag, allowing the airbag to be deployed toward the seat occupant side from the seam part torn in a cross shape.

In the above-described technology, a cross-shaped seam portion (burst portion) is provided, and the stretch of the seat cover is suppressed by the webbing cloths, which promotes the tearing of the vertical seam portion (first sewing line). However, when a webbing cloth is provided only on the flank covering portion (right flank surface), it is not possible to control the stretch of the cover portion on the seating surface side, and there is a risk that it will be difficult to ensure appropriate tearability of the vertical seam portion, such as tear range and tear speed. Furthermore, in the above-described configuration, from a viewpoint of more appropriately ensuring the tearability of the vertical seam portion, it is desirable to be able to control the tearability of the horizontal seam portion (second sewing line) as well. The present invention is devised in consideration of the above-described point, and the problem that the present invention aims to solve is to form a burst portion of a seat cover, which is a portion from which an airbag will be ejected, with two intersecting sewing lines while more appropriately ensuring its tearability.

SUMMARY OF INVENTION

In a first aspect of the invention, a vehicle seat has a seat back that serves as a backrest, the seat back including a seat cover that forms an outer surface of the seat, and an airbag that is held on a seat inner side of the seat cover, the airbag being configured to be deployed toward a seat occupant side while a burst portion formed at a sewn portion of the seat cover is released. In the burst portion, a first sewing line extending in a seat up-down direction and a second sewing line extending in a direction intersecting the first sewing line intersect with each other. Assuming that the seat cover portion around the burst portion is divided into a plurality of sections by the first sewing line and the second sewing line, a webbing cloth is provided for each section to regulate stretch of the seat cover in a planar direction when the airbag is deployed.

In a second aspect of the invention, at least one region of a first stretchable region in which stretch propagates in the planar direction within one section or a second stretchable region in which stretch propagates in the planar direction across two sections divided above and below by the second sewing line is formed in the seat cover portion around the burst portion. In the first stretchable region, at least one restraining portion for restraining stretch of the seat cover is provided, and the webbing cloth provided in the one section is disposed so as to be extended between the first sewing line and the restraining portion. In the second stretchable region, another restraining portion that restrains stretch of the seat cover is provided, and the webbing cloths arranged in the two sections are connected to each other via the second sewing line so as to be extended between the first sewing line and the another restraining portion.

In a third aspect of the invention, the restraining portion formed linearly is provided in the first stretchable region along the second sewing line.

In a fourth aspect of the invention, the second sewing line is provided with a reinforcing portion that reinforces the second sewing line so as to prevent the second sewing line from opening.

According to the first aspect of the present invention, the burst portion of the seat cover, which is the portion from which the airbag will be ejected, can be formed by two intersecting sewing lines while more appropriately ensuring the tearability thereof. Furthermore, according to the second aspect, the tearability of the burst portion can be ensured while taking into consideration the stretchability of the seat cover around the burst portion. Furthermore, according to the third aspect, the tearability of the burst portion can be more appropriately ensured. According to the fourth aspect, the tearability of the burst portion can be more appropriately ensured.

DESCRIPTION OF EMBODIMENTS

Hereinafter, an embodiment of the present invention will be described with reference to FIGS. 1 to 12. In each drawing, arrows indicating a front-rear direction, an up-down direction, and a left-right direction (seat width direction) of a vehicle seat are appropriately illustrated. For convenience, FIG. 2 only partially illustrates groove portions provided in a seat pad.

Overview of Vehicle Seat

Figure 1:
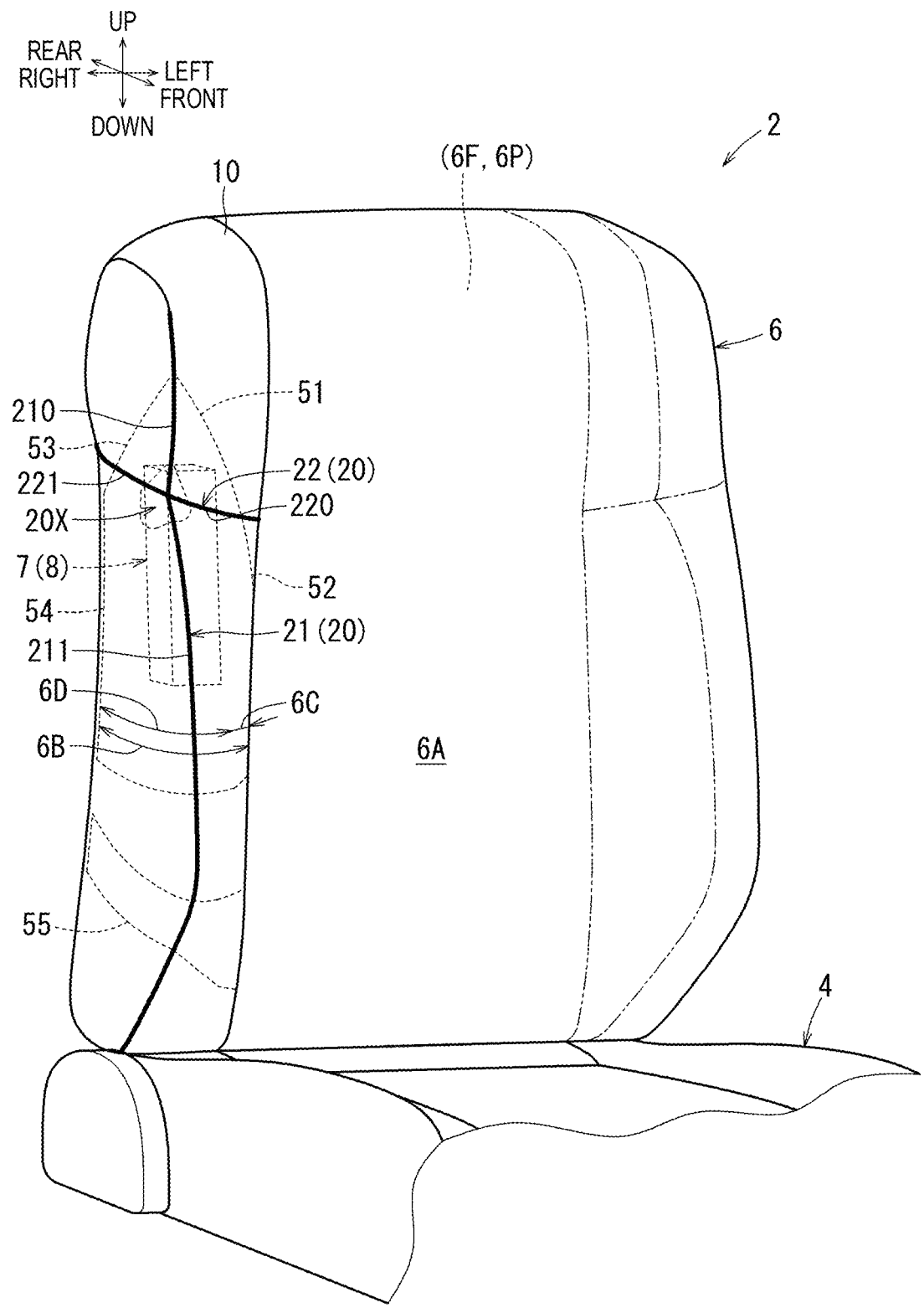
FIG. 1 is a schematic perspective view of a vehicle seat.
Figure 2:
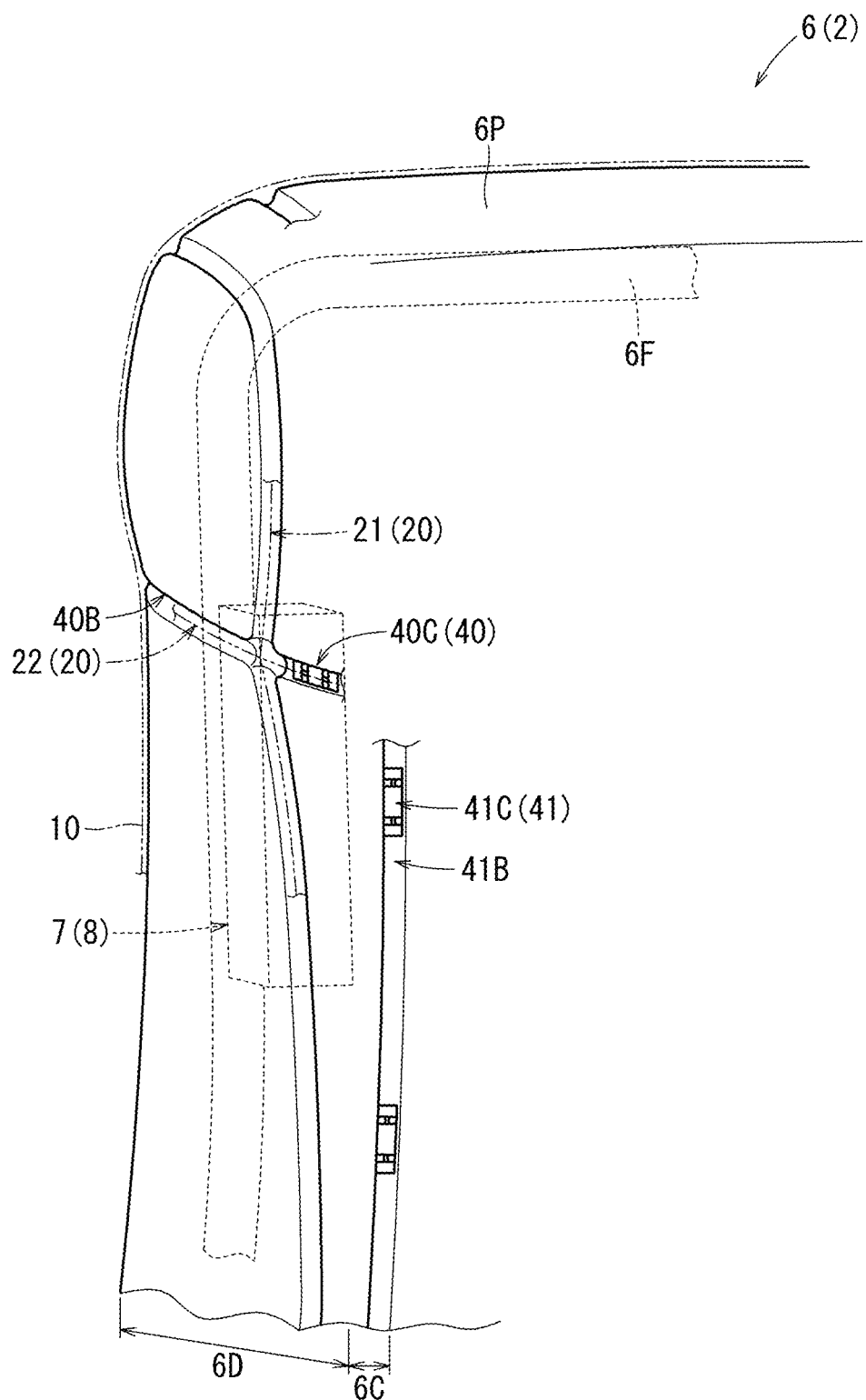
FIG. 2 is a schematic perspective view of the vehicle seat illustrating a seat pad.

First, an overview of a vehicle seat 2 illustrated in FIG. 1 will be described. In this vehicle seat 2, a lower part of a seat back 6 is connected to a rear part of a seat cushion 4, which serves as a seating portion, via a recliner (not illustrated). The seat back 6 is a member on which an occupant rests, and is formed in a vertically long rectangular shape when viewed from the front. Referring to FIGS. 1 and 2, in the seat back 6, a seat cover 10 that forms an outer surface of the seat covers a seat frame 6F made of metal that forms a skeleton of the seat, and a seat pad 6P made of foamed resin that elastically supports the occupant.

A seating surface 6A on which the occupant can sit is formed in a center of a front surface of the seat back 6 illustrated in FIG. 1 so as to extend in a seat up-down direction. The seat back 6 is provided with banks 6B that bulge toward a seating side on both sides (right and left) of the seating surface 6A in the seat width direction (for convenience, in FIG. 1, a corresponding reference number is attached only to the bank on the right side). A top plate side portion 6C of the seat back 6 is formed by an inner side (a left side portion in the case of the bank 6B on the right) of the bank 6B. A right flank surface 6D of the seat back 6 is formed on an outer side (a right side portion of the bank 6B on the right) of the bank 6B.

An airbag device 7 is provided inside the seat back 6 illustrated in FIG. 1 on an upper right side thereof. The airbag device 7 incorporates an airbag 8 in an uninflated state and an inflator (gas supply device, gas generating agent, or the like) for inflating the airbag 8. Referring to FIGS. 1 and 2, the airbag device 7 is disposed on a seat inner side of the seat cover 10 by being held by the seat frame 6F. In the above-described configuration, the airbag 8 inflates, that is, is deployed from the airbag device 7 and expands during a vehicle collision. The inflated airbag 8 then is ejected toward a seat occupant side as a seam portion (burst portion 20 described below) of the seat cover 10 is released.

Figure 3:
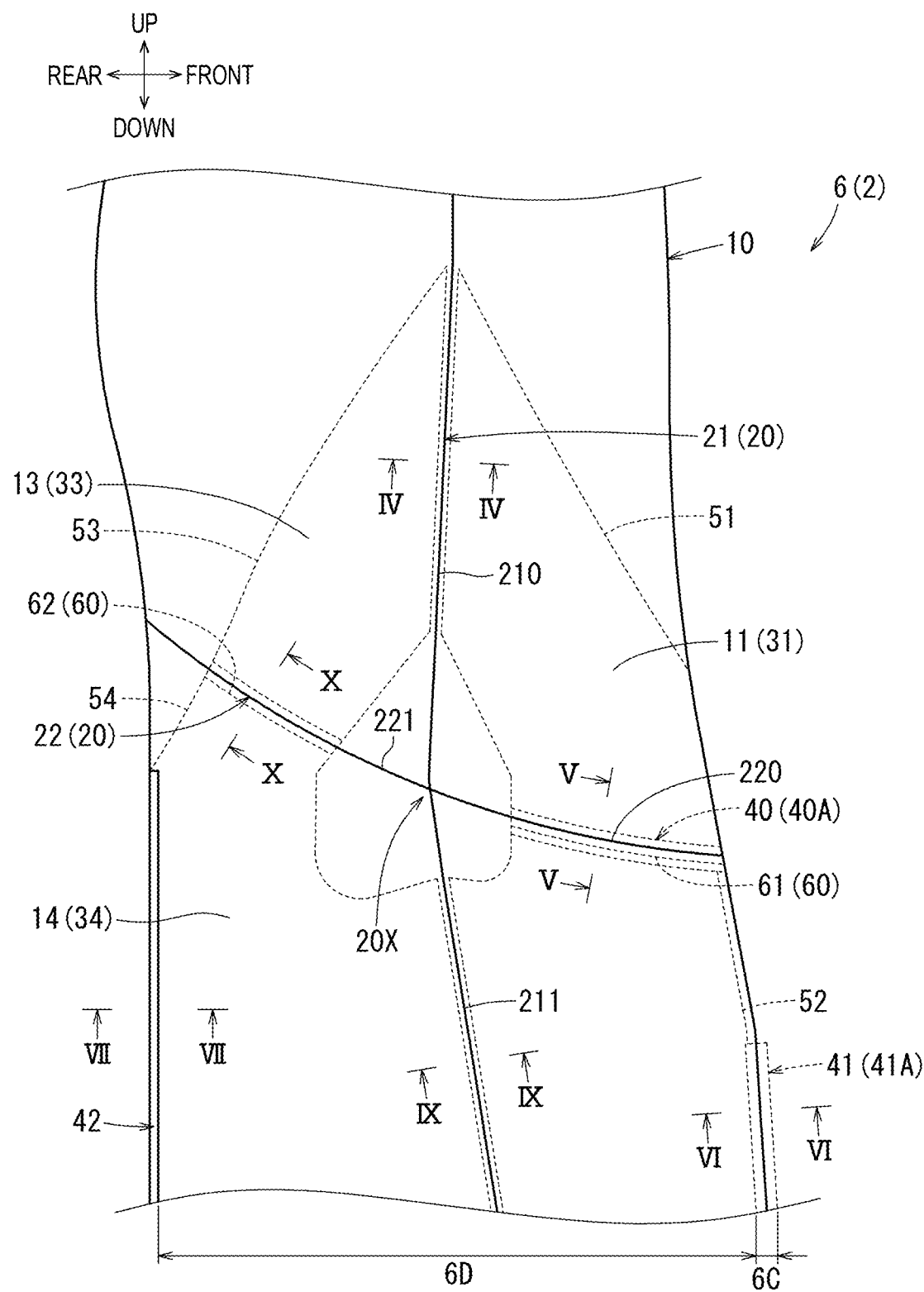
FIG. 3 is a schematic side view of a seat back illustrating a seat cover around a burst portion.
Figure 4:
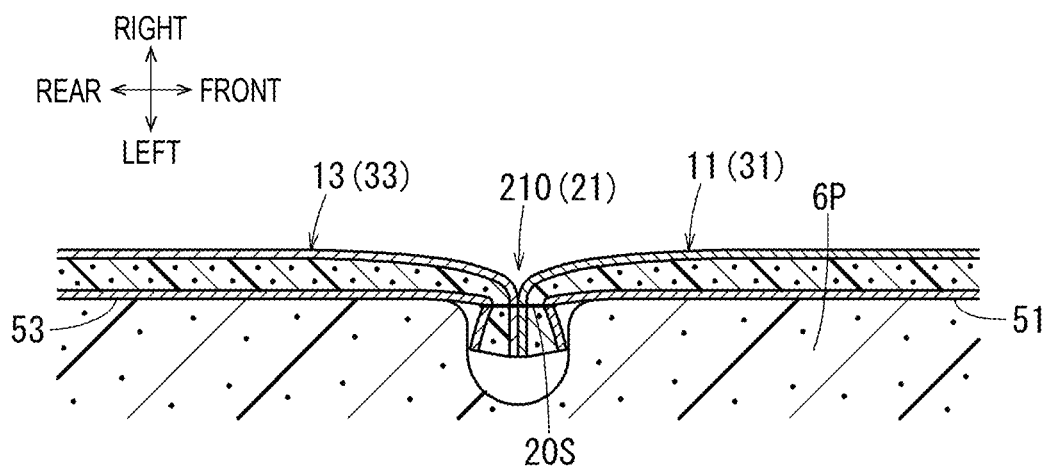
FIG. 4 is a cross-sectional view taken along a line IV-IV in FIG. 3.

Referring to FIGS. 1 and 3, the burst portion 20 is formed in a cross shape on the right side of the seat cover 10 as a seam portion from which the airbag 8 will be ejected. That is, the seat cover 10 has a first sewing line 21 formed on the right flank surface 6D side as a seam part extending vertically along the seat. Further, in an upper portion of the seat cover 10, a second sewing line 22 as another seam part crosses the first sewing line 21 so as to form a cross. In the above-described configuration, in order to ensure that the airbag 8 illustrated in FIG. 1 can be deployed appropriately, it is desirable to ensure tearability of the burst portion 20, and in particular, tearability of the first sewing line 21. Therefore, in this embodiment, by using the configuration described below (restraining portion, webbing cloth, reinforcing portion, stretchable region) illustrated in FIGS. 3 and 11, the burst portion 20 of the seat cover 10 is formed with two intersecting sewing lines while more appropriately ensuring its tearability. The configuration of the seat cover 10 will be described in detail below in the order of the burst portion 20, restraining portions (40 to 42), webbing cloths (51 to 54), a reinforcing portion 60, and stretchable regions (71A, 71B, 72).

Burst Portion

First, the burst portion 20 having a cross shape illustrated in FIGS. 1 and 3 is formed by the intersection of the first sewing line 21 and the second sewing line 22 as described above. This first sewing line 21 extends vertically on the right flank surface 6D and is formed in a range from the top to near a bottom end of the right flank surface 6D. The second sewing line 22 is formed so as to extend from the right flank surface 6D to the top plate side portion 6C. The second sewing line 22 extends in a direction intersecting with the first sewing line 21 in a planar direction of the seat cover 10, that is, extends generally in a seat front-rear direction on the right flank surface 6D side illustrated in FIG. 3, and extends in the seat width direction on the top plate side portion 6C side. In a right portion of the seat cover 10, the first sewing line 21 and the second sewing line 22 intersect at the upper position, so that the burst portion 20 is formed in a cross shape. The burst portion 20 is formed in the upper portion of the seat back 6 illustrated in FIG. 1, and is disposed in a vicinity of an upper end of the airbag device 7.

How to Divide Seat Cover Portion Around Burst Portion (Division Method)

The seat cover 10 portion (hereinafter referred to as the seat cover 10 portion) around the burst portion 20 illustrated in FIG. 3 can be divided into a plurality of sections (first section 31 to fourth section 34) by the first sewing line 21 and the second sewing line 22. That is, the seat cover 10 portion is divided into a front side and a rear side by the first sewing line 21 and is further divided into an upper side and a lower side by the second sewing line 22. In each of the first section 31 to the fourth section 34, one cover portion (any of a first cover portion 11 to a fourth cover portion 14) that forms the seat cover 10 portion is disposed.

Here, the first cover portion 11 to the fourth cover portion 14 illustrated in FIG. 3 can be formed of, for example, fabric (woven fabric, knitted fabric, nonwoven fabric) or leather (natural leather, artificial leather). Additionally, a padding material such as urethane laminate and a backing fabric (not illustrated) are disposed on a back side of each cover portion. In the above-described seat cover 10 portion, adjacent cover portions are sewn and connected to each other by the first sewing line 21 and the second sewing line 22 (see an hidden stitch 20S illustrated in FIG. 4 and the like). At an intersection 20X (and its surroundings) of the first sewing line 21 and the second sewing line 22, seam allowances of the four cover portions are sewn and connected together, making this area thicker than the other seam parts.

Each Section

In the above-described configuration, the first section 31 in which the first cover portion 11 is disposed is provided on an upper front side of the seat cover 10 portion illustrated in FIG. 3. The first section 31 is surrounded by an upper portion (210) of the first sewing line and a front portion (220) of the second sewing line, and is separated and partitioned from the other seat cover 10 portions. Further, the second section 32 in which a second cover portion 12 is disposed is provided on a lower front side of the seat cover 10 portion. The second cover portion 12 is surrounded by a lower portion (211) of the first sewing line and the front portion (220) of the second sewing line. In addition, the third section 33 in which a third cover portion 13 is disposed is provided on an upper rear side of the seat cover 10 portion, and this third section 33 is surrounded by the upper portion (210) of the first sewing line and a rear portion (221) of the second sewing line. The fourth section 34 in which a fourth cover portion 14 is disposed is provided on a lower rear side of the seat cover 10 portion, and this fourth section 34 is surrounded by the lower portion (211) of the first sewing line and the rear portion (221) of the second sewing line.

Restraining Portion

Figure 5:
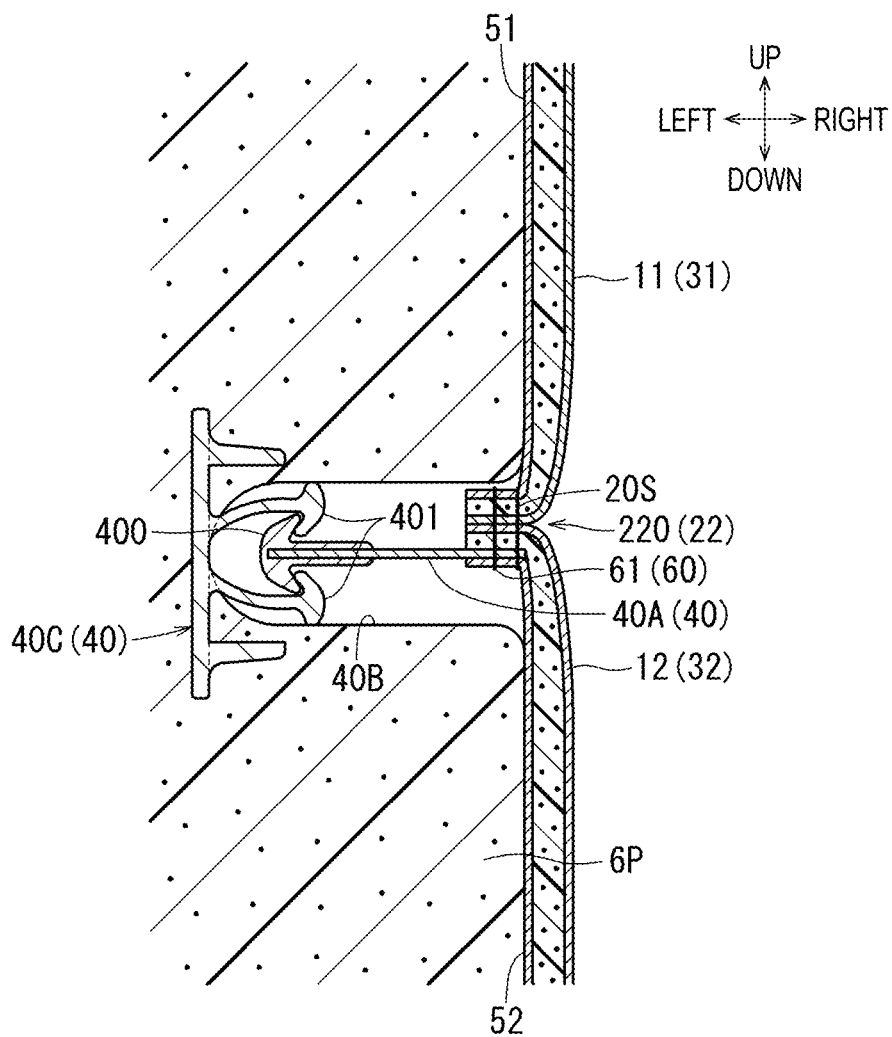
FIG. 5 is a cross-sectional view taken along a line V-V in FIG. 3.

The seat cover 10 portion illustrated in FIG. 3 is provided with a plurality of restraining portions (lateral restraining portion 40, front vertical restraining portion 41, rear vertical restraining portion 42) for restraining the stretching. Referring to FIGS. 3 and 5, the lateral restraining portion 40 is formed by engaging a lateral suspender portion 40A made of resin, which is fixed to the seat cover 10, with the seat pad 6P side. The lateral suspender portion 40A is formed from a substantially rectangular resin plate, and is sewn together with the first cover portion 11 and the second cover portion 12 at their sewn portion with their thickness direction facing up and down. The lateral suspender portion 40A is arranged linearly along the front portion (220) of the second sewing line, and further, the arrowhead-shaped tip portion 400 of the lateral suspender portion 40A faces the seat pad side.

Referring to FIGS. 2 and 5, a lateral groove portion 40B is provided along the second sewing line 22 at an upper position of the seat pad 6P. A lateral engagement portion 40C having a plate shape is fixed to the front position of this lateral groove portion 40B, that is, a position corresponding to the front portion 220 of the second sewing line, and a pair of engagement claws 401 are protruded from the surface of this lateral engagement portion 40C. In a state where the seat pad 6P is covered with the seat cover 10 illustrated in FIG. 5, the tip portion 400 of the lateral suspender portions 40A is engaged with the engagement claw 401 of the lateral engagement portion 40C. As a result, the seat cover 10 illustrated in FIG. 3 is provided with the lateral restraining portion 40 having a linear shape that restricts the seat cover 10 from stretching, along the front portion (220) of the second sewing line. The lateral restraining portion 40 is located at a position slightly forward from the intersection 20X (thick portion) of each sewing line, and extends from the right flank surface 6D toward the top plate side portion 6C.

Figure 6:
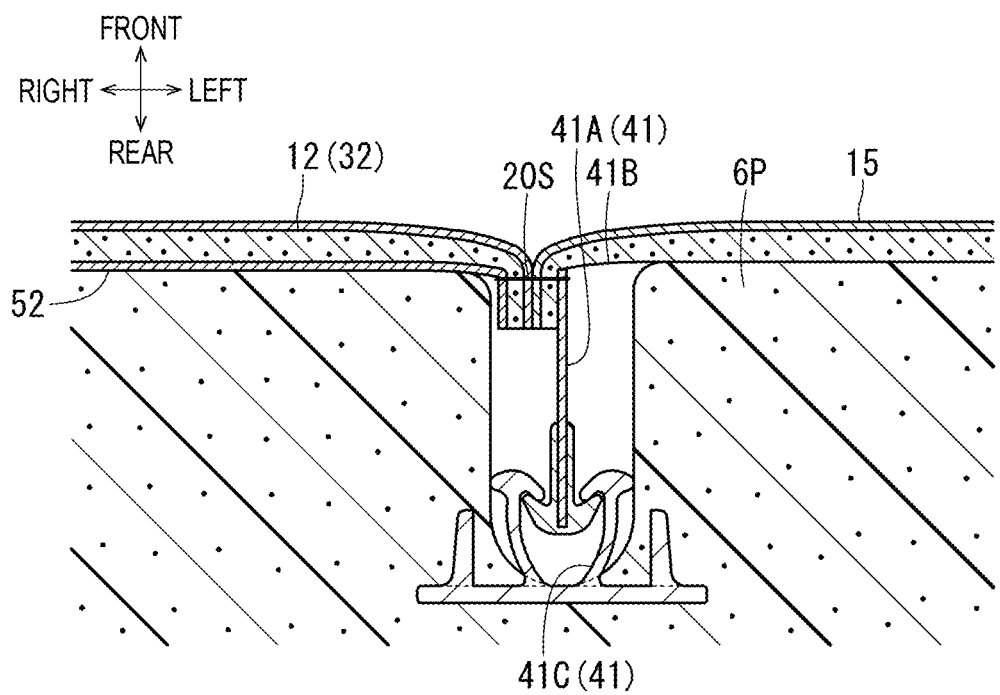
FIG. 6 is a cross-sectional view taken along a line VI-VI in FIG. 3.
Figure 7:
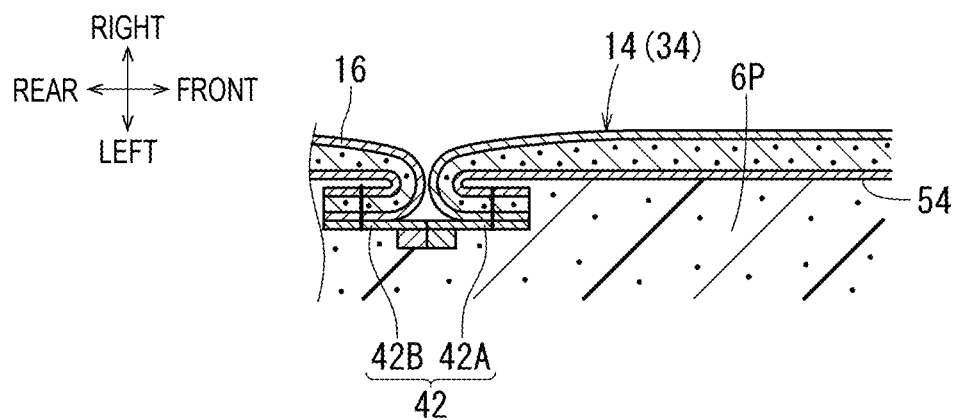
FIG. 7 is a cross-sectional view taken along a line VII-VII in FIG. 3.

The front vertical restraining portion 41 illustrated in FIG. 3 is formed by engaging a vertical suspender portion 41A fixed to the seat cover 10 with a seat pad side. The vertical suspender portion 41A is sewn together with a left edge (front side) of the second cover portion 12 illustrated in FIG. 6 and a cover portion 15 on the seating surface side at their sewn portion, and extends in the seat up-down direction. Referring to FIGS. 2 and 6, the seat pad 6P is formed with a vertical groove portion 41B extending in the seat up-down direction along the left edge (front side) of the second cover portion 12. When the seat pad 6P is covered with the seat cover 10, the vertical suspender portion 41A is engaged with a vertical engagement portion 41C in the vertical groove portion 41B. In this way, the seat cover 10 is provided with the front vertical restraining portion 41 that restricts the stretch of the seat cover 10 and extends in the seat up-down direction along the left edge (front side) of the second cover portion 12.

The rear vertical restraining portion 42 illustrated in FIG. 3 is a portion formed with a linear fastener structure, and is provided between the rear edge of the fourth cover portion 14 and the cover portion on the rear side. That is, referring to FIGS. 3 and 7, the rear vertical restraining portion 42 is formed by engagement between a first fastener 42A fixed to the fourth cover portion 14 and a second fastener 42B fixed to a cover portion 16 on the rear side. Portions of the first fastener 42A and the second fastener 42B that are sewn and connected to the corresponding cover portions are made of resin. In this way, the seat cover 10 is provided with the rear vertical restraining portion 42 that restricts the stretch of the seat cover 10, extending in the seat up-down direction along the rear edge of the fourth cover portion 14.

Webbing Cloth

Figure 8:
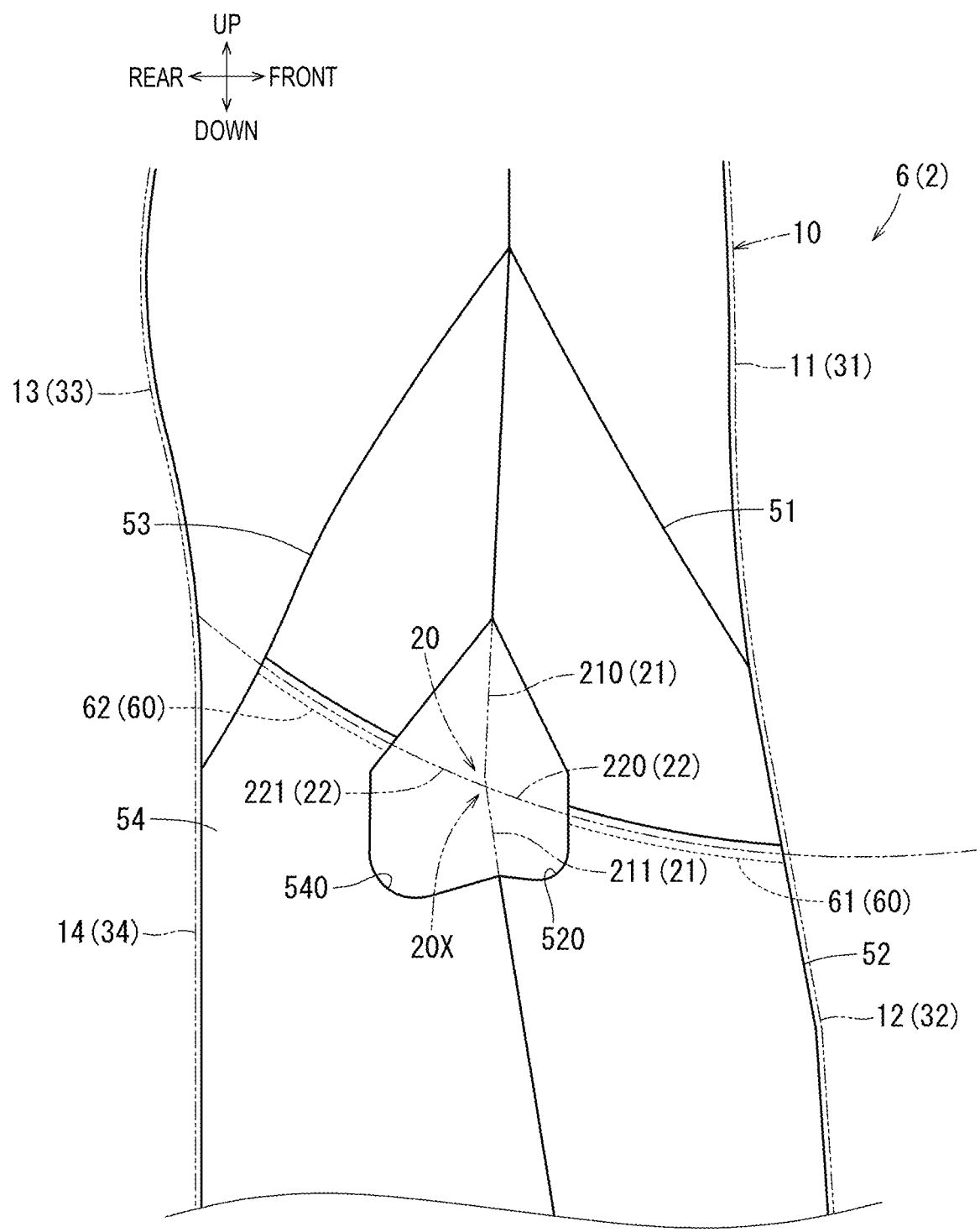
FIG. 8 is a schematic perspective side view of the seat back illustrating each webbing cloth around the burst portion.
Figure 9:
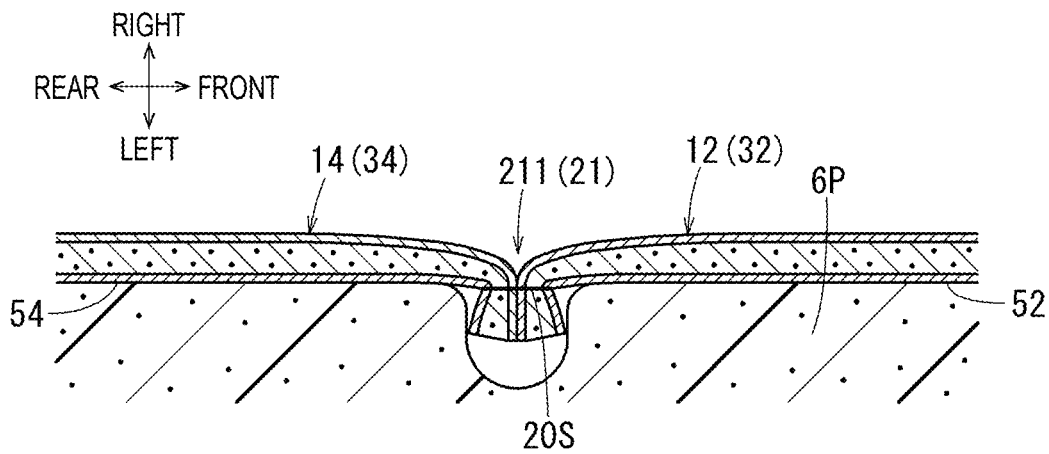
FIG. 9 is a cross-sectional view taken along a line IX-IX in FIG. 3.
Figure 10:
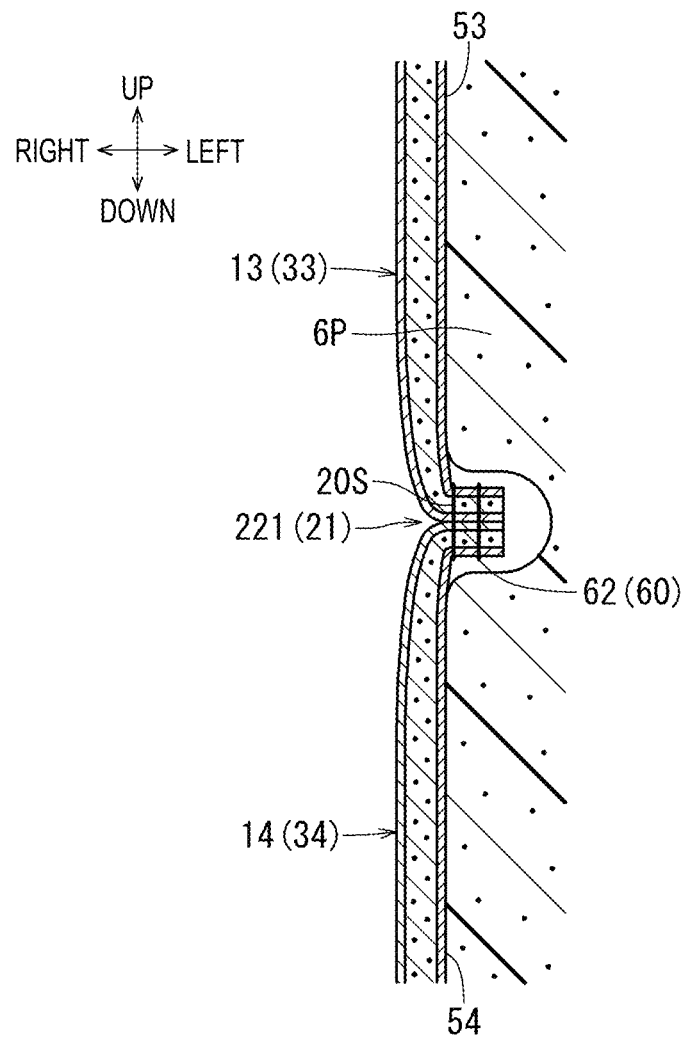
FIG. 10 is a cross-sectional view taken along a line X-X in FIG. 3.

Next, the seat cover 10 portion illustrated in FIGS. 3 and 8 is provided with a plurality of webbing cloths (first webbing cloth 51 to fourth webbing cloth 54). Each webbing cloth is a member that restricts the stretch of the seat cover 10 in the planar direction, and is disposed on a back side of the seat cover 10. Here, the material of each webbing cloth is not particularly limited, but it is preferable that material of the webbing cloth has a rigidity sufficient to not be broken by the pressure when the airbag inflates, and is typically formed of a surface material such as fabric that is less stretchable than the seat cover 10. In the seat cover 10 portion, as described below, a webbing cloth (any of the first webbing cloth 51 to the fourth webbing cloth 54) is provided for each of the first section 31 to the fourth section 34. That is, the first webbing cloth 51 to the fourth webbing cloth 54 are arranged so as to fit within the corresponding sections without straddling the first sewing line 21 and the second sewing line 22.

First, in the first section 31 illustrated in FIGS. 3 and 8, the first webbing cloth 51 having a generally trapezoidal shape in plan view is disposed on the back side of the first cover portion 11. The first webbing cloth 51 is disposed so as to span between the upper portion (210) of the first sewing line and the front portion (220) of the second sewing line. A rear edge of the first webbing cloth 51 is sewn together with the first cover portion 11 and the third cover portion 13 and is sewn and connected to the upper portion (210) of the first sewing line (see FIG. 4). A lower edge of the first webbing cloth 51 is sewn together with the first cover portion 11 and the second cover portion 12, and is sewn and connected to the front portion (220) of the second sewing line, that is, the lateral restraining portion 40 (see FIG. 5).

In the second section 32 illustrated in FIGS. 3 and 8, the second webbing cloth 52 having a generally rectangular shape in plan view is disposed on the back side of the second cover portion 12. The second webbing cloth 52 is disposed so as to span between the lower portion (211) of the first sewing line and the front vertical restraining portion 41. A front edge side of the second webbing cloth 52 is sewn together with the left edge side (front side) of the second cover portion 12 and the cover portion 15 on the seating surface side, and is sewn and connected to the front vertical restraining portion 41 (see FIG. 6). A rear edge of the second webbing cloth 52 is sewn together with the second cover portion 12 and the fourth cover portion 14 and is sewn and connected to the lower portion (211) of the first sewing line (see FIG. 9). Furthermore, an upper end of the second webbing cloth 52 is sewn together with the first cover portion 11 and the second cover portion 12 in the same manner as the first webbing cloth 51, and is sewn and connected to the lateral restraining portion 40 (see FIG. 5).

In the third section 33 illustrated in FIGS. 3 and 8, the third webbing cloth 53 having a generally trapezoidal shape in plan view is disposed on the back side of the third cover portion 13. The third webbing cloth 53 is disposed so as to span between the upper portion (210) of the first sewing line and the rear portion (221) of the second sewing line. A front edge of the third webbing cloth 53 is sewn and connected to the upper portion (210) of the first sewing line, similar to the first webbing cloth 51 (see FIG. 4). A lower edge of the third webbing cloth 53 is sewn together with the third cover portion 13 and the fourth cover portion 14 and is sewn and connected to the rear portion (221) of the second sewing line (see FIG. 10).

In the fourth section 34 illustrated in FIGS. 3 and 8, the fourth webbing cloth 54 having a generally rectangular shape in plan view is disposed on the back side of the fourth cover portion 14. The fourth webbing cloth 54 is disposed so as to span between the lower portion (211) of the first sewing line and the rear vertical restraining portion 42. A rear edge of the fourth webbing cloth 54 is sewn together with the rear edge of the fourth cover portion 14 and the cover portion 16 on the rear side, and is sewn and connected to the rear vertical restraining portion 42 (see FIG. 7). Similarly to the second webbing cloth 52, a front edge of the fourth webbing cloth 54 is sewn and connected to the lower portion (211) of the first sewing line (see FIG. 9). Furthermore, an upper end of the fourth webbing cloth 54 is sewn and connected to the rear portion (221) of the second sewing line, similarly to the third webbing cloth 53 (see FIG. 10).

Referring to FIG. 8, in the seat cover 10 portion, the first webbing cloth 51 to the fourth webbing cloth 54 can be disposed so as to avoid the intersection 20X of the first sewing line 21 and the second sewing line 22. For example, in this embodiment, planar shapes of the first webbing cloth 51 to the fourth webbing cloth 54 are devised to avoid overlapping of each webbing cloth with the intersection 20X. That is, the first webbing cloth 51 and the third webbing cloth 53 are formed into a substantially trapezoidal planar shape, and upper base portions thereof are disposed away from the intersection 20X. The second webbing cloth 52 has a generally rectangular planar shape, but is provided with a front recess 520 in which a portion that should overlap the intersection 20X is cut out. Similarly, the fourth webbing cloth 54 is provided with a rear recess 540 in which a portion that should overlap the intersection 20X is cut out.

In the above-described configuration, while each webbing cloth can be appropriately arranged around the intersection 20X, it is not necessary to sew each webbing cloth to the thick portion of the seat cover 10, thereby reducing the labor required for sewing.

Reinforcing Portion

In addition, in the seat cover 10 portion illustrated in FIG. 3, reinforcing portions 60 are provided at both the front and rear portions of the second sewing line 22 (for convenience, in each drawing, formation ranges of the reinforcing portions 60 are illustrated by dashed lines). This reinforcing portion 60 is a portion for reinforcing the second sewing line 22 and preventing it from opening, and in this embodiment, the reinforcing portion 60 is formed by a front stitch portion 61 and a rear stitch portion 62 which are provided separately from the hidden stitch 20S (see FIGS. 5 and 10). This type of front stitch portion 61 and rear stitch portion 62 can be formed from a sewing thread that is more rigid than the hidden stitch 20S, may be made of a higher fineness than the hidden stitch 20S, and may use a material with higher strength than the hidden stitch 20S. Referring to FIGS. 3 and 5, at the front portion (220) of the second sewing line, the first cover portion 11 and the second cover portion 12 are sewn and connected together with the corresponding webbing cloths by the front stitch portion 61 serving as the reinforcing portion 60. This front stitch portion 61 can be provided in an area overlapping the first webbing cloth 51 and the second webbing cloth 52, and is positioned so as to extend along the second sewing line 22 at a position slightly forward of the intersection 20X. Also, referring to FIGS. 3 and 10, at the rear portion (221) of the second sewing line, the third cover portion 13 and the fourth cover portion 14 are sewn and connected together with the corresponding webbing cloths by the rear stitch portion 62 serving as the reinforcing portion 60. This rear stitch portion 62 can be provided in an area overlapping the third webbing cloth 53 and the fourth webbing cloth 54, and is positioned so as to extend along the second sewing line 22 at a position slightly rearward of the intersection 20X.

Stretchable Region

Figure 11:
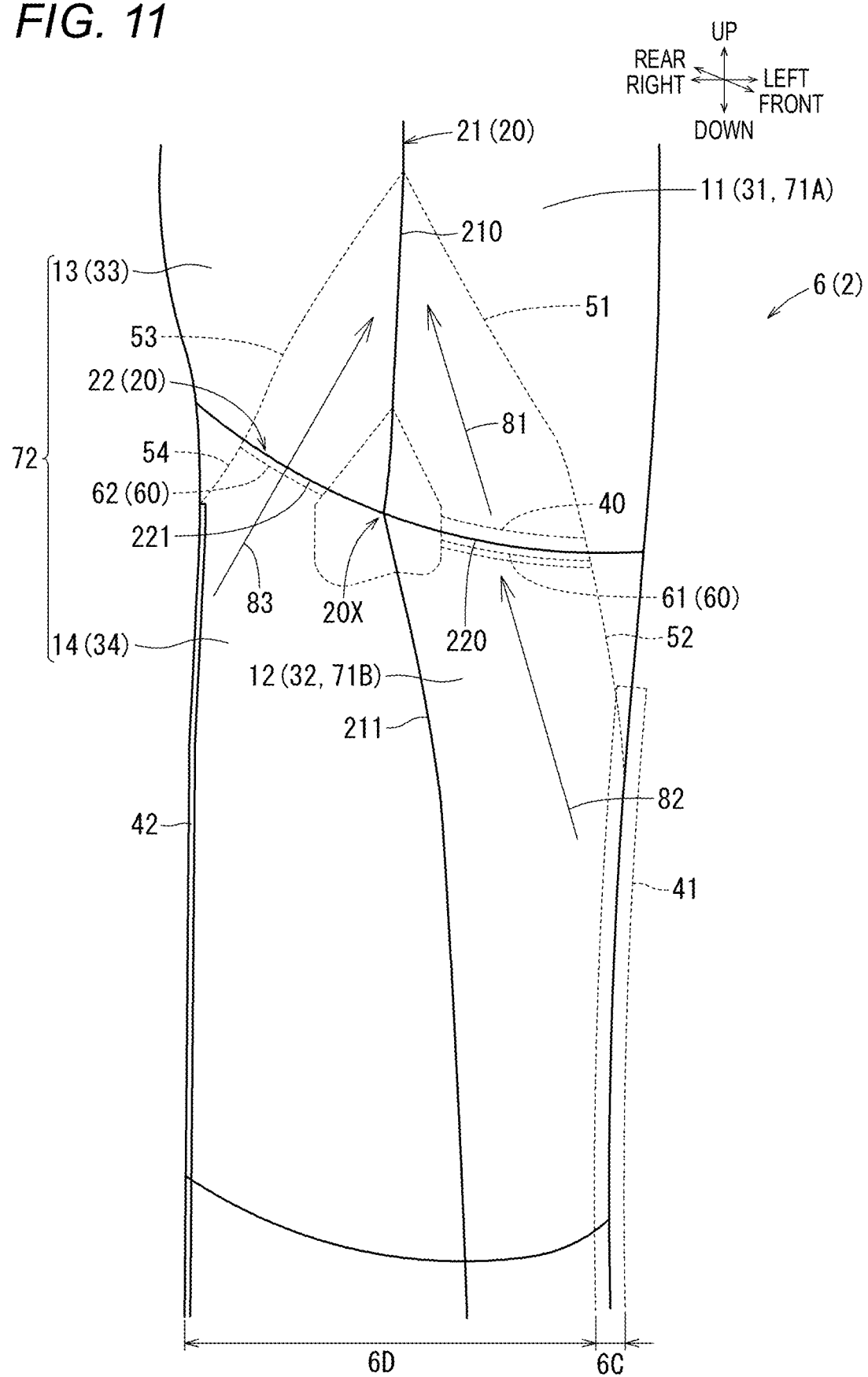
FIG. 11 is a schematic perspective view of the seat back illustrating each stretchable region.

Referring to FIGS. 3 and 11, the seat cover 10 has appropriate stretchability and is configured such that the stretch propagates in the planar direction. For this reason, in the seat cover 10 portion, the stretch gradually propagates in the planar direction by receiving the inflation pressure of the airbag, but in the above-described configuration, the propagation of the stretch is prevented by each of the restraining portions (40 to 42). Furthermore, when the airbag 8 is deployed, the first sewing line 21 quickly breaks as described below, so that the propagation of stretch across the first sewing line 21 is unlikely to occur. As a result, in the above-described seat cover 10 portion, the first sewing line 21 and each restraining portion (40 to 42) form a plurality of stretchable region (upper stretchable region 71A, lower stretchable region 71B, second stretchable region 72) in which stretch propagates in the planar direction.

First Stretchable Region

In the seat cover 10 portion illustrated in FIG. 11, a pair of first stretchable regions (upper stretchable region 71A, lower stretchable region 71B) are formed in each of the sections. That is, the upper stretchable region 71A is a region formed within the first section 31. In this upper stretchable region 71A, the stretch in the planar direction propagates only to the range of the first section 31 separated by the upper portion (210) of the first sewing line and the lateral restraining portion 40, that is, the first cover portion 11 (in FIG. 11, a direction in which the stretch propagates from the lateral restraining portion is indicated by an arrow 81). In the upper stretchable region 71A, the first webbing cloth 51 of the first section 31 is disposed so as to span between the upper portion (210) of the first sewing line and the lateral restraining portion 40 as described above. The above-described lateral restraining portion 40 is an example of a restraining portion provided in the first stretchable region of the present invention.

Further, the lower stretchable region 71B illustrated in FIG. 11 is a region formed within the second section 32. In this lower stretchable region 71B, the stretch in the planar direction propagates only to the range of the second section 32 separated by the lower portion (211) of the first sewing line, the lateral restraining portion 40, and the front vertical restraining portion 41, that is, the second cover portion 12 (in FIG. 11, a direction in which the stretch propagates from the front vertical restraining portion is indicated by an arrow 82). In the lower stretchable region 71B, the second webbing cloth 52 of the second section 32 is disposed so as to span between the lower portion (211) of the first sewing line and the front vertical restraining portion 41, and between the lower portion (211) of the first sewing line and the lateral restraining portion 40, as described above. The above-described front vertical restraining portion 41 is another example of the restraining portion provided in the first stretchable region of the present invention.

Second Stretchable Region

Furthermore, in the seat cover 10 portion illustrated in FIG. 11, the second stretchable region 72 is formed across the third section 33 and the fourth section 34. Here, the third section 33 and the fourth section 34 are divided into upper and lower sections by the rear portion (221) of the second sewing line. However, the rear portion (221) of the second sewing line is not fixed to the seat pad 6P side, and therefore the stretch easily propagates (see FIG. 10). Therefore, in the second stretchable region 72, the stretch in the planar direction propagates across the third section 33 and the fourth section 34, which are divided by the first sewing line 21 and the rear vertical restraining portion 42 (in FIG. 11, the direction in which the stretch propagates from the rear vertical restraining portion is illustrated by an arrow 83). That is, in the second stretchable region 72, the stretch in the planar direction propagates in the front-rear and up-down directions across the third cover portion 13 and the fourth cover portion 14.

In a lower part of the second stretchable region 72 illustrated in FIG. 11, the fourth webbing cloth 54 is extended between the lower portion (211) of the first sewing line and the rear vertical restraining portion 42. Furthermore, the third webbing cloth 53 and the fourth webbing cloth 54 are extended between the upper portion (210) of the first sewing line and the rear vertical restraining portion 42. That is, the third webbing cloth 53 and the fourth webbing cloth 54 are sewn and connected together via the rear portion (221) of the second sewing line as described above (see FIG. 10). The front edge of the third webbing cloth 53 is sewn and connected to the upper portion (210) of the first sewing line. As a result, the third webbing cloth 53 and the fourth webbing cloth 54 (the webbing cloths to be placed in the two sections) are extended between the upper portion (210) of the first sewing line and the rear vertical restraining portion 42 in a connected state via the second sewing line 22. The above-described rear vertical restraining portion 42 corresponds to another restraining portion provided in the second stretchable region of the present invention.

Behavior of Burst Portion when Airbag is Deployed

In the seat back 6 illustrated in FIG. 1, in the event of a vehicle collision, the airbag 8 inflates from the airbag device 7 and is ejected toward the seat occupant side while tearing appropriate locations of the burst portion 20 having a cross shape. Here, the airbag 8 inflates at a position slightly below the burst portion 20 having a cross shape. Therefore, the inflation pressure of the airbag 8 is first applied to the lower portion (211) of the first sewing line. The lower end side of the first sewing line 21 is secured to be tearable by another webbing cloth 55 or the like. In this type of configuration, from the viewpoint of ensuring that the airbag 8 is appropriately ejected, it is desirable to form the burst portion 20 with two intersecting sewing lines while more appropriately ensuring its tearability.

Therefore, in the vehicle seat 2 illustrated in FIGS. 3 and 8, the seat cover 10 portion is divided into a plurality of sections (first section 31 to fourth section 34) by the first sewing line 21 and the second sewing line 22. Further, the webbing cloth (first webbing cloth 51 to fourth webbing cloth 54) for restricting the stretch of the seat cover 10 in the planar direction when the airbag 8 is deployed is provided for each section. In the above-described configuration, since webbing cloths are provided in all of the plurality of sections, it is possible to control the stretch of the seat cover 10 portion for each section. The function of each webbing cloth will be described below in the order of when the lower portion of the first sewing line is torn and when the upper portion of the first sewing line is torn.

Function of Webbing Cloth

Referring to FIGS. 3, 8, and 11, in the vehicle seat 2, the inflation pressure of the airbag is first applied to the lower portion (211) of the first sewing line. In this case, the stretch of the seat cover 10 portions before and after the lower portion (211) of the first sewing line can be controlled by the second webbing cloth 52 of the second section 32 and the fourth webbing cloth 54 of the fourth section 34. That is, in the lower stretchable region 71B formed in the second section 32, stretch propagates from the front vertical restraining portion 41 to the lower portion (211) of the first sewing line (see the direction indicated by the arrow 82 in FIG. 11). Therefore, in the lower stretchable region 71B, the second webbing cloth 52 extended between the lower portion (211) of the first sewing line and the front vertical restraining portion 41 can restrain the stretch of the second cover portion 12 in the front-rear and up-down directions. In this case, the second webbing cloth 52 is also extended between the lower portion (211) of the first sewing line and the lateral restraining portion 40, so that the vertical stretch of the second cover portion 12 can be more reliably restrained. Similarly, in the fourth section 34 (lower side of the second stretchable region 72), the front-rear and up-down stretch of the fourth cover portion 14 can be suppressed by the fourth webbing cloth 54 extending between the lower portion (211) of the first sewing line and the rear vertical restraining portion 42 (the suppression of up-down stretch between the third and fourth sections will be described below). According to the above-described configuration, the second webbing cloth 52 and the fourth webbing cloth 54 function to more appropriately tear open the lower portion (211) of the first sewing line (see FIG. 12).

Continuing with reference to FIGS. 3, 8, and 11, the inflation pressure of the airbag is transmitted from the lower portion (211) side to the upper portion (210) side of the first sewing line. In this case, in the seat cover 10 portion, the webbing cloth is provided in each of the first section 31 to the fourth section 34. This prevents unintended stretch of the seat cover 10 on the upper portion (210) of the first sewing line, prevents excessive tearing of the second sewing line 22, and allows the inflation pressure of the airbag to be more appropriately transmitted to the upper portion (210) of the first sewing line. Furthermore, in the seat cover 10 portion, the second sewing line 22 is reinforced at appropriate locations by the front stitch portion 61 and the rear stitch portion 62 as the reinforcing portions 60. This makes it possible to more reliably limit the tear range of the second sewing line 22 so as not to become excessively large (see FIG. 12). Furthermore, by limiting the tear range of the second sewing line 22, the inflation pressure (inflating force) of the airbag 8 is less likely to escape to the second sewing line 22 side, and is more appropriately transmitted to the upper portion (210) of the first sewing line with as little loss as possible. According to the above-described configuration, the inflation pressure of the airbag 8 can be applied to the first sewing line 21 efficiently and quickly, which contributes to ensuring the tearability, particularly the tear speed.

Figure 12:
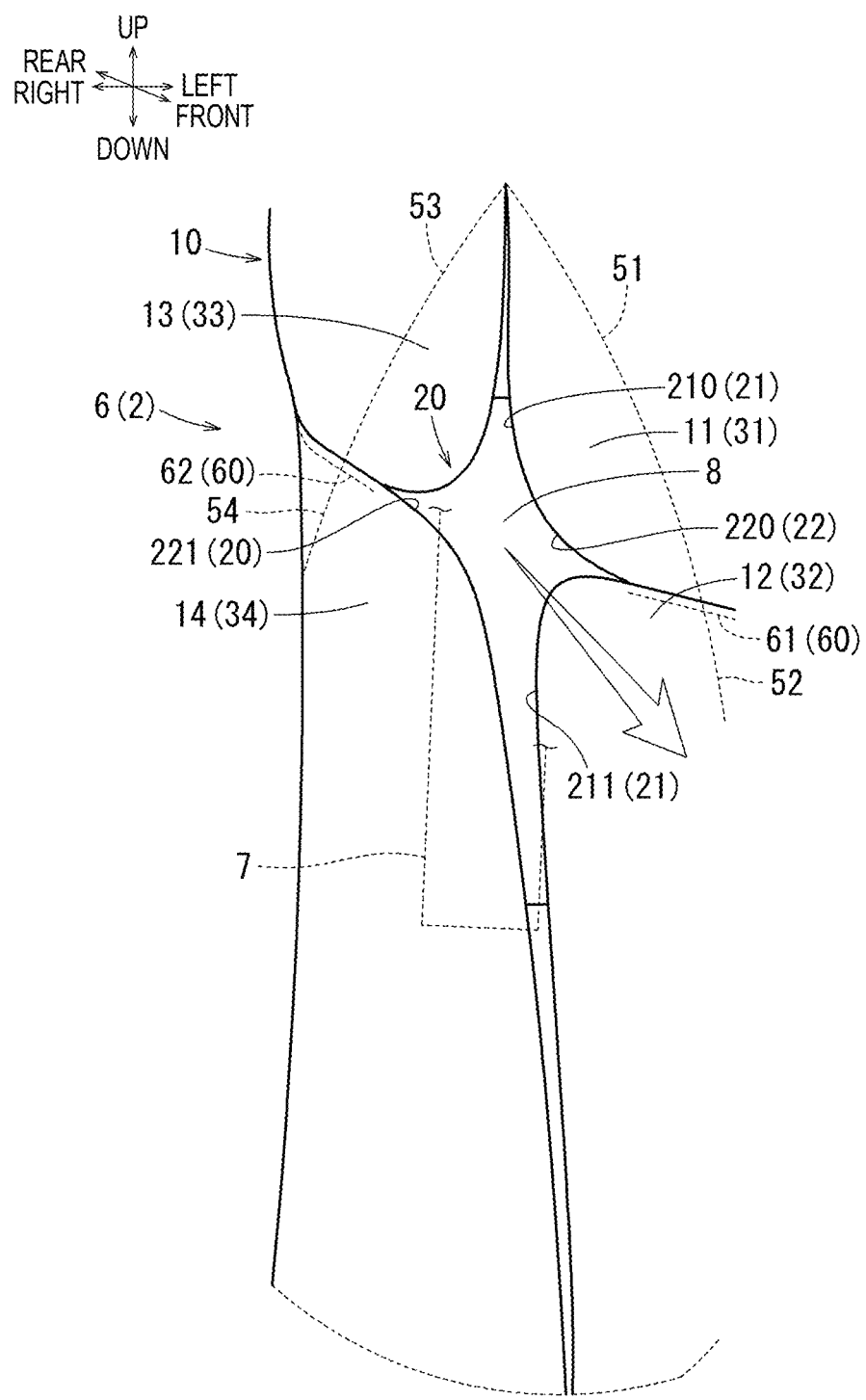
FIG. 12 is a schematic perspective view of the seat back when an airbag is deployed.

Referring to FIGS. 3, 8, and 11, in the upper portion (210) of the first sewing line, the stretch of the seat cover 10 portion on the front side thereof can be controlled by the first webbing cloth 51 of the first section 31. That is, in the upper stretchable region 71A formed in the first section 31, stretch propagates from the lateral restraining portion 40 to the upper portion (210) of the first sewing line (see the direction indicated by the arrow 81 in FIG. 11). Therefore, in the upper stretchable region 71A, the first webbing cloth 51 extending between the upper portion (210) of the first sewing line and the lateral restraining portion 40 can restrain the stretch of the first cover portion 11 in the front-rear and up-down directions. At the same time, in the upper portion (210) of the first sewing line, the stretch of the seat cover 10 portion on the rear side thereof can be controlled by the third webbing cloth 53 of the third section 33 and the fourth webbing cloth 54 of the fourth section 34. That is, in the second stretchable region 72 spanning the third section 33 and the fourth section 34, stretch propagates from the rear vertical restraining portion 42 to the upper portion (210) of the first sewing line (see the direction indicated by the arrow 83 in FIG. 11). Therefore, in the second stretchable region 72, as described above, the third webbing cloth 53 and the fourth webbing cloth 54 are connected via the second sewing line 22 and extend between the upper portion (210) of the first sewing line and the rear vertical restraining portion 42. As a result, in the second stretchable region 72, the third webbing cloth 53 and the fourth webbing cloth 54 can suppress not only the front-rear stretch of the third cover portion 13, but also the up-down stretch spanning the third cover portion 13 and the fourth cover portion 14. According to the above-described configuration, as illustrated in FIG. 12, the first sewing line 21 is caused to tear largely in the seat up-down direction due to the inflation pressure of the airbag 8, which contributes to ensuring more appropriate tearability, particularly the tear range.

As described above, in this embodiment, a plurality of sections (first section 31 to fourth section 34) divided by the first sewing line 21 and the second sewing line 22 are set in the seat cover 10 portion around the burst portion 20, and the webbing cloth (any of the first webbing cloth 51 to fourth webbing cloth 54) is provided in each of the plurality of sections. This makes it possible to control the stretch of the seat cover 10 portion around the burst portion 20 for each section, and makes it possible to more reliably tear each sewing line at the appropriate location. Thus, according to this embodiment, the burst portion 20 of the seat cover 10, which is the portion from which the airbag 8 will be ejected, can be formed by two intersecting sewing lines while more appropriately ensuring the tearability.

Furthermore, in this embodiment, the webbing cloth (first webbing cloth 51 to fourth webbing cloth 54) of each section can be more appropriately positioned depending on the type of stretchable region formed in the seat cover 10 portion around the burst portion 20. In addition, in this embodiment, the first webbing cloth 51 and the second webbing cloth 52 arranged in the upper stretchable region 71A and the lower stretchable region 71B (first stretchable region) can be respectively provided between the first sewing line 21 and the lateral restraining portion 40 on the second sewing line 22. In this embodiment, the reinforcing portion 60 functions to control the tearability of the second sewing line 22, for example by limiting the tear range, thereby making it possible to more appropriately ensure the tearability of the first sewing line 21.

The vehicle seat of the this embodiment is not limited to the above-described embodiment, and various other embodiments are possible. In this embodiment, the configuration of the burst portion is exemplified, but the configuration of the burst portion is not limited thereto. For example, the burst portion can be formed not only by crossing the first sewing line and the second sewing line in a cross shape, but also by forming only the front (or rear) portion of the second sewing line and crossing it in a horizontal T-shape. When the burst portion is formed in a horizontal T-shape, the seat cover portion around the burst portion is divided into three sections, and for example, the third and fourth sections illustrated in FIG. 3 are formed as one section (first stretchable region). In this case, a single cover portion and a single webbing cloth can be disposed in the one section. Further, the sections illustrated in FIG. 3 may be reversed in the front-rear direction, with the second stretchable region being provided on the front side. In addition, a second stretchable region can be provided both before and after the first sewing line illustrated in FIG. 3. In this case, the webbing cloths of the first and second sections can be extended between the front vertical restraining portion and the first sewing line. The burst portion can be formed at any appropriate position on the seat cover as long as the burst portion allows the airbag to be deployed toward the seating side. For example, the first sewing line may be formed between the flank surface and the top plate side portion, or the first sewing line and the second sewing line may be formed only on the flank surface. Each cover portion may be formed of a single or a plurality of cover pieces, and the webbing cloth may be connected to each cover portion by various methods other than sewing. In each section, one or more webbing cloths may be arranged, and if possible, they may be arranged so as to overlap with the intersection. Also, one end of the webbing cloth contained in one section can be fixed to the seat frame side as long as the one end does not protrude into another section.

In addition, in this embodiment, the configuration of the restraining portion is exemplified, but the configuration of the restraining portion is not limited thereto. For example, various structures such as a suspender structure, a fastener structure (either a line, point or hook-and-loop fastener structure), a hog ring structure, and the like may be appropriately selected and used as the configuration of the restraining portion. The first stretchable region illustrated in FIG. 11 can have at least one of a restraining portion extending vertically and a restraining portion extending front-rear (crossing direction). When the first stretchable region has a plurality of restraining portions, the webbing cloths may be connected to all of the plurality of restraining portions, or the webbing cloth may be connected to only one restraining portion selected from the plurality of restraining portions. For example, in the lower stretchable region illustrated in FIG. 3, the second webbing cloth can be connected to at least one of the lateral restraining portion and the front vertical restraining portion.

The first sewing line only needs to extend in the up-down direction, and the first sewing line may be formed linearly, or may be inclined forward or rearward, or curved. Moreover, the second sewing line only needs to intersect with the first sewing line, and the direction of intersection can be appropriately selected. The second sewing line may be provided with a reinforcing portion at least at one of its front and rear portions, and if possible, the reinforcing portion may be omitted. Furthermore, the area in which the reinforcing portion is formed can be set independently of the webbing cloth, and if possible, the reinforcing portion can be formed in the vicinity of the intersection, that is, so as to overlap with the thick portion of the seat cover. The reinforcing portion may be formed continuously or intermittently along the second sewing line. The reinforcing portion can be formed by stitching, adhesion, fusion, or by using reinforcing materials such as staples and hog rings.

Furthermore, the configuration of the vehicle seat can be changed as appropriate, and the position at which the airbag device is disposed can be selected as appropriate. The airbag device is usually disposed on an outer side (for example, a right side in the case of a right seat, and a left side in the case of a left seat) of the seat back when the vehicle seat is placed in a passenger compartment. The seat pad may also be provided with a hole that serves as a passage for the expanding airbag, and a weakened portion that is released by the inflation pressure of the airbag. The configuration of this embodiment can be applied to general vehicle seats, such as seats for cars, airplanes, trains, and ships.

What is claimed is:

1. A vehicle seat having a seat back that serves as a backrest, the seat back including a seat cover that forms an outer surface of the seat, and an airbag that is held on a seat inner side of the seat cover, the airbag being configured to be deployed toward a seat occupant side while a burst portion formed at a sewn portion of the seat cover is released, wherein in the burst portion, a first sewing line extending in a seat up-down direction and a second sewing line extending in a direction intersecting the first sewing line intersect with each other, and assuming that the seat cover portion around the burst portion is divided into a plurality of sections by the first sewing line and the second sewing line, a webbing cloth is provided for each section to regulate stretch of the seat cover in a planar direction when the airbag is deployed.

2. The vehicle seat according to claim 1, wherein at least one region of a first stretchable region in which stretch propagates in the planar direction within one section or a second stretchable region in which stretch propagates in the planar direction across two sections divided above and below by the second sewing line is formed in the seat cover portion around the burst portion, in the first stretchable region, at least one restraining portion for restraining stretch of the seat cover is provided, and the webbing cloth provided in the one section is disposed so as to be extended between the first sewing line and the restraining portion, in the second stretchable region, another restraining portion that restrains stretch of the seat cover is provided, and the webbing cloths arranged in the two sections are connected to each other via the second sewing line so as to be extended between the first sewing line and the another restraining portion.

3. The vehicle seat according to claim 2, wherein the restraining portion formed linearly is provided in the first stretchable region along the second sewing line.

4. The vehicle seat according to claim 1, wherein the second sewing line is provided with a reinforcing portion that reinforces the second sewing line so as to prevent the second sewing line from opening.

5. The vehicle sheet according to claim 2, wherein the restraining portion connects the seat cover in the first stretchable region with a seat pad of the vehicle sheet.

6. The vehicle sheet according to claim 2, wherein the another restraining portion connects the seat cover in the second stretchable region with the seat cover in a rear face region of the vehicle sheet.

* * * * *